US008643536B2

(12) United States Patent
Cavirani et al.

(10) Patent No.: US 8,643,536 B2
(45) Date of Patent: Feb. 4, 2014

(54) RADIO FREQUENCY POSITIONING SYSTEM FOR VEHICLES

(75) Inventors: Vittorio Cavirani, Traversetolo (IT); Francesco Trotta, Perugia (IT); Luca Marcaccioli, Perugia (IT); Roberto Vincenti Gatti, Perugia (IT); Franco Manzini, Sassilow (IT); Domenico Di Terlizzi, Rovo di Pugua (IT)

(73) Assignee: Elettric 80 S.p.A., Viano (Reggio Emilia) (IT)

( * ) Notice: Subject to any disclaimer, the term of this patent is extended or adjusted under 35 U.S.C. 154(b) by 171 days.

(21) Appl. No.: 13/147,480

(22) PCT Filed: Feb. 2, 2010

(86) PCT No.: PCT/IB2010/050460
§ 371 (c)(1),
(2), (4) Date: Aug. 2, 2011

(87) PCT Pub. No.: WO2010/086839
PCT Pub. Date: Aug. 5, 2010

(65) Prior Publication Data
US 2011/0285593 A1 Nov. 24, 2011

(30) Foreign Application Priority Data
Feb. 2, 2009 (IT) .............................. BO2009A0046

(51) Int. Cl.
*G01S 13/42* (2006.01)
(52) U.S. Cl.
USPC ........... 342/118; 342/125; 342/133; 342/140; 342/146; 342/188
(58) Field of Classification Search
USPC ......... 342/118, 125, 133, 139–140, 146–147, 342/188, 450, 453, 463
See application file for complete search history.

(56) References Cited

U.S. PATENT DOCUMENTS 4,703,444 A * 10/1987 Storms et al. ................. 342/463
5,483,455 A    1/1996 Lay et al.
(Continued)

FOREIGN PATENT DOCUMENTS

DE   102006005281 A1   8/2007
EP       0325539 A1    7/1989
WO     WO93/03396 A2   2/1993

OTHER PUBLICATIONS

Chiu, L., et al. "Retrodirective Array for RFID and Microwave Tracking Beacon Applications" Microwave and Optical Technology Letters, vol. 48, No. 2. Feb. 2006. pp. 409-411.

(Continued)

*Primary Examiner* — John B Sotomayor
(74) *Attorney, Agent, or Firm* — Tutunjian & Bitetto, P.C.

(57) ABSTRACT

A positioning system for radio frequency devices includes a two-way radio antenna, for vehicles, having a transmitting and a receiving element. Reference antennas have retro-directive arrays which can shape the signal beams in elevation; polarize transmission and reception signals according to a circular or a linear polarization, the polarized transmission retro-directively reflecting signals having the same polarization as the incident ones in the case of circular polarization, or retro-directively reflecting signals having orthogonal polarization in the case of linear polarization. An encoder is included for transmitting an identification code of the reference antenna. A controller processes the spatial and temporal data resulting from communication through the radio waves transmitted and received by the vehicle antennas and reflected by the reference antennas. The controller calculates the distance of the vehicle from the reference antennas that have reflected the signal transmitted by the antennas.

17 Claims, 6 Drawing Sheets

(56) References Cited

U.S. PATENT DOCUMENTS

| | | | |
|---|---|---|---|
| 6,304,210 B1* | 10/2001 | Allison et al. | 342/357.41 |
| 6,700,535 B2* | 3/2004 | Gilkes et al. | 342/387 |
| 6,996,420 B2* | 2/2006 | Hirano et al. | 455/562.1 |
| 7,630,738 B2* | 12/2009 | Hirano et al. | 455/562.1 |
| 8,026,848 B2* | 9/2011 | Hanson | 342/359 |
| 8,179,251 B2* | 5/2012 | Alsindi et al. | 340/539.1 |
| 2004/0257293 A1 | 12/2004 | Friedrich et al. | |
| 2005/0228613 A1* | 10/2005 | Fullerton et al. | 702/150 |
| 2008/0040029 A1* | 2/2008 | Breed | 701/208 |
| 2008/0042815 A1* | 2/2008 | Breed et al. | 340/435 |
| 2008/0158062 A1* | 7/2008 | Fullerton et al. | 342/458 |
| 2009/0030605 A1* | 1/2009 | Breed | 701/208 |
| 2011/0285593 A1* | 11/2011 | Cavirani et al. | 342/457 |

OTHER PUBLICATIONS

Luxey, C., et al. "A Retrodirective Transponder With Polarization Duplexing for Dedicated Short-Range Communications" IEEE Transactions on Microwave Theory and Techniques, vol. 47, No. 9. Sep. 1999. pp. 1910-1915.

Mastela, D., et al. "Improving FMCW-Based Object Tracking Using Phased Array Antennas Combined With Sigma-Point Kalman Filters" Mar. 2006. (5 Pages) http://duepublico.uni-duisburg-essen.de/servlets/DerivateServlet/Derivate-14694/Final_Papers/GM0040-F.pdf.

Vossiek, M., et al. "Wireless Local Positioning" IEEE Microwave Magazine, vol. 4, No. 4. Dec. 2003. pp. 77-86.

* cited by examiner

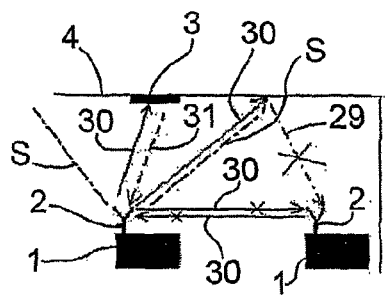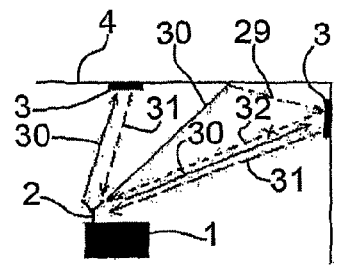
FIG.14　　　　　FIG.15
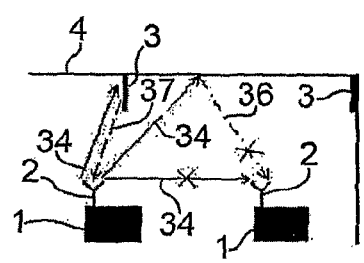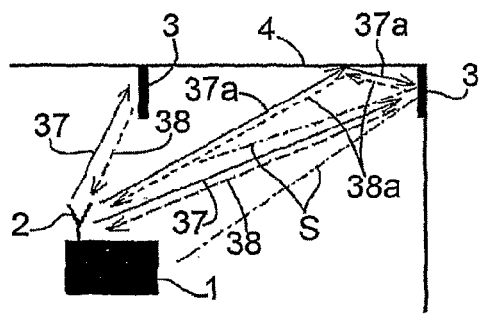
FIG.16　　　　　FIG.17
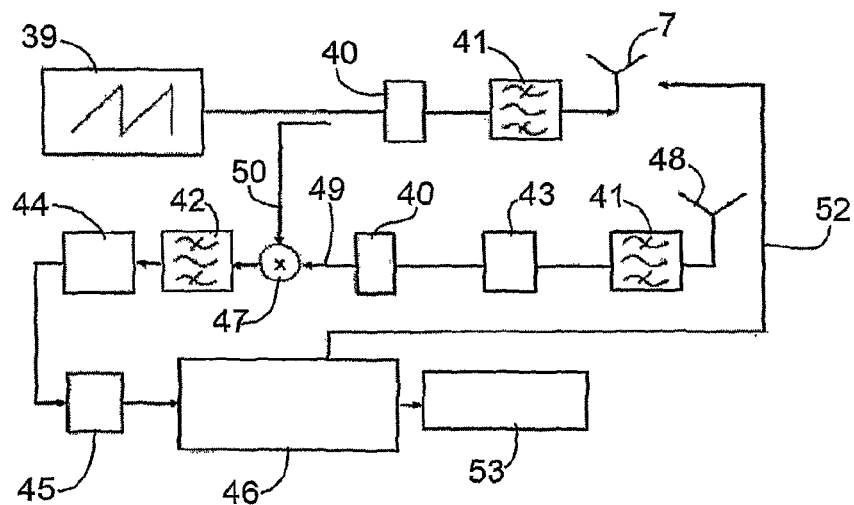
FIG.18

RADIO FREQUENCY POSITIONING SYSTEM FOR VEHICLES

TECHNICAL FIELD OF THE INVENTION

The present invention relates to radio frequency positioning system for vehicles, for example automatic guided vehicles, with radio frequency antennas located on the vehicles themselves and reference antennas located in predetermined positions of an area in which the vehicles are moving.

According to a version of the present invention, the reference antennas of the area in which the vehicles are moving comprise the so-called retro-directive arrays, abbreviated as RDA.

According to another version of the present invention, the antennas on the vehicle may be of the directive type and may optionally operate in combination with the reference antennas of the area, provided with retro-directive arrays.

The present invention is used for detecting the position of a vehicle, for example a manual guided vehicle, or an automatic guided vehicle, abbreviated as AGV, especially within areas of the closed type, for example warehouses, stores, etc.

According to yet another version, the present invention is used for detecting the position of AGV vehicles that move together with standard manual guide within the above areas, and thus for detecting and coordinating the position of the AGV vehicles and the position of manual guided vehicles.

PRIOR ART

Several systems are known in the state of the art for identifying the position of a vehicle in closed areas such as warehouses and the like.

Generally, known systems consist of two subsystems: moving vehicles that represent the target nodes, and the reference nodes, which are positioned in the area in which the vehicles must move.

The reference nodes provide spatial and temporal information that is used for determining the position of moving vehicles.

The mostly used known systems for vehicle positioning, in particular for AGV vehicles, are based on laser or radio frequency technologies such as for example UWB (Ultra-Wide-Band) systems, and FMCW (Frequency-Modulated Continuous Wave) systems.

Laser positioning systems, also known as LPS, consist of a laser head positioned on a telescopic shaft mounted on the vehicle, for example an automatic guided vehicle, or AGV, and of a series of reflectors positioned in known zones, for example in a warehouse.

The laser head, rotating by 360 degrees, emits laser beams, the reflectors impinged by the vehicle beam reflect the beam itself towards the source, that is, towards the laser head.

In this way, processing the spatial and temporal information coming from the laser beam sent by the laser head, reflected by the reflector, and again received by the laser head, it is possible to determine the vehicle position.

To determine the vehicle position with the required accuracy, the laser head must communicate with a minimum number of reflectors—in general at least three—and as a consequence such a number of reflectors must be arranged in the warehouse as to allow the above communications in any possible position of the vehicle within the warehouse itself.

For this reason, it is necessary to reserve a portion of the inside surfaces of the warehouse for positioning the reflectors to the disadvantage of the actually usable space.

Laser positioning systems operate with a rotating head that projects the laser beam on horizontal scanning plane, thus they exhibit the problem of ensuring not only a direct optical line between the vehicle laser beam and the reflectors positioned within the warehouse, but an entire horizontal scanning plane completely free from obstacles in the entire warehouse. Therefore, there are consequent limits to the possibilities of storing goods, positioning shelves, etcetera, in the warehouse itself as they may interfere with the optical line between the vehicle laser head and the reflectors, and moreover it is often necessary to position the laser head on top of a telescopic shaft enabling it to operate on an obstacle-free horizontal plane.

Another problem of laser positioning systems that implies even significant localisation errors is due to the laser beams that may accidentally be reflected by the metal walls within the warehouse, for example by metal shelves, or by any other obstacle having reflecting features.

Accidentally reflected laser beams reach the vehicle receiving head, which does not make a distinction between the beams properly reflected by the reflectors and the accidentally reflected beams, thus generating errors about the positioning of the moving vehicle.

A further defect of the above laser positioning system is given by the fact that it is not possible to have information about the reflector that reflects the laser beam, that is, it is not possible to identify which reflector has reflected the laser beam emitted by the head.

In brief, the laser positioning system exhibits the following problems:

the signal scanning by the head takes place on two dimensions—two-dimensional scanning, also called 2-D scanning—which implies the need of a free horizontal plane for aiming the laser;

localisation errors due to the vehicle inclination in certain situations and to the consequent inclination of the telescopic shaft that causes the laser beam to deviate from the horizontal plane where the reflectors are;

limited possibility of extending the telescopic shaft whereon the laser head is mounted.

Recently, three-dimensional laser systems have been introduced which partly solve the above problems, to the disadvantage of a reduced scanning speed.

Unlike laser beams, radio waves are not affected by air density variations and propagate according to a spherical or conical geometry, it is therefore possible to transmit the signal also in the presence of some obstacles in the moving zone.

Vehicle positioning systems based on UBW and FMCW radio frequency technologies comprise a two/way radio antenna mounted on the vehicle and a series of reflecting antennas, or reflecting tags, located in known positions within the area where the vehicle moves.

The antenna provided on the vehicle is capable of transmitting and receiving radio waves in an isotropic manner (in all directions), whereas reflecting antennas receive and retransmit the radio waves emitted by the source, that is, the antenna on the vehicle.

Theoretically, the techniques with UWB and FMCW electromagnetic waves allow localising a vehicle within a closed area with an accuracy of a few centimeters.

However, experiments have shown that the actual accuracies that may be achieved in localising a vehicle do not exceed 30 cm, in the current more advanced systems, due to the problem caused by multiple paths, or "multipaths", of the radio or electromagnetic waves within the area.

Of course, 30 cm accuracy localisation values are unacceptable for applications in areas like warehouses, stores etcetera.

Multiple paths are generated by the electromagnetic waves that propagating in the air are reflected by the walls and/or by the obstacles that meet and recombine to the receiver, which thus actually receives the sum of all multiple shares and therefore is hardly able to discriminate the share coming from the direct path that links the reflecting antenna to the vehicle, and which is the only one that allows calculating the straight distance between the transmitting antenna and the reflecting tag.

FIG. 2 shows a diagram showing the pattern of the electromagnetic wave response of a positioning system in a closed area using UWB or FMCW radiofrequencies, according to the prior art: the peaks caused by the reflection of radio waves due to the effect of multiple paths are easily detectable.

A positioning system operating in an area will therefore receive, besides the signal reflected by the reflecting tags, all the peaks resulting from the effect of multiple paths that will appear as false reflecting antennas located at different distances.

The solutions proposed for compensating the effect of multiple paths are the most varied, but none aims at reducing or limiting the effect in se, as it is assumed that two-way radio antennas of vehicles and reflecting antennas must be omnidirectional antennas at least on the azimuth plane, that is, on the horizontal plane, if the vehicles must be localised in two dimensions, that is, substantially in a plane.

Actually, the vehicle antennas may also be of the directive type and transmit—and thus receive—in a certain sector only.

Directive antennas typically are larger than omnidirectional or isotropic antennas, and since they observe the scene within limited angles, the two-way radio antennas of the vehicles must therefore be made so as to rotate about their axis to observe the reflecting antennas of the area over 360 degrees.

The system of rotating the antenna is already used, for example, in more complex radar systems.

This type of solution cannot be used for portable positioning systems as it would be too cumbersome and unpractical, but for some types of vehicles, for example automatic guided vehicles, this size may be reduced within admissible limits.

AIMS OF THE INVENTION

An object of the present invention is to improve the prior art.

Another object of the present invention is to present a positioning system for vehicles which should allow easy installation in areas, especially closed areas.

A further object of the present invention is to provide a positioning system for vehicles which should allow obtaining high vehicle localisation accuracy.

Yet another object of the present invention is to provide a positioning system for vehicles which should be able to operate also in the presence of obstacles that partly shield the visibility, or the direct optical line, of the positioning system components. Being capable of irradiating radio waves according to different directions, it operates three-dimensionally and thus it does not require a totally free working surface.

Another object of the present invention is to provide a positioning system for vehicles with a simple and inexpensive production.

According to an aspect of the invention, a positioning system for vehicles is provided according to the independent claim 1.

According to another aspect of the invention, a two-way radio directive antenna is provided according to claim 2.

According to a further aspect of the invention, the combined use of sector directive antennas and reference antennas, with linear or circular polarisation, is provided according to claim 3.

The dependent claims refer to preferred and advantageous embodiments of the invention.

BRIEF DESCRIPTION OF THE DRAWINGS

Further characteristics and advantages of the invention will appear more clearly from the description of preferred embodiments of the positioning system for vehicles, made by way of a non-limiting example in the accompanying drawings, wherein:

FIGS. 14-17 show some operating examples of the system according to the present invention within an area; and FIG. 18 shows a block diagram of the system according to the present invention.

EMBODIMENTS OF THE INVENTION

Figure 1:
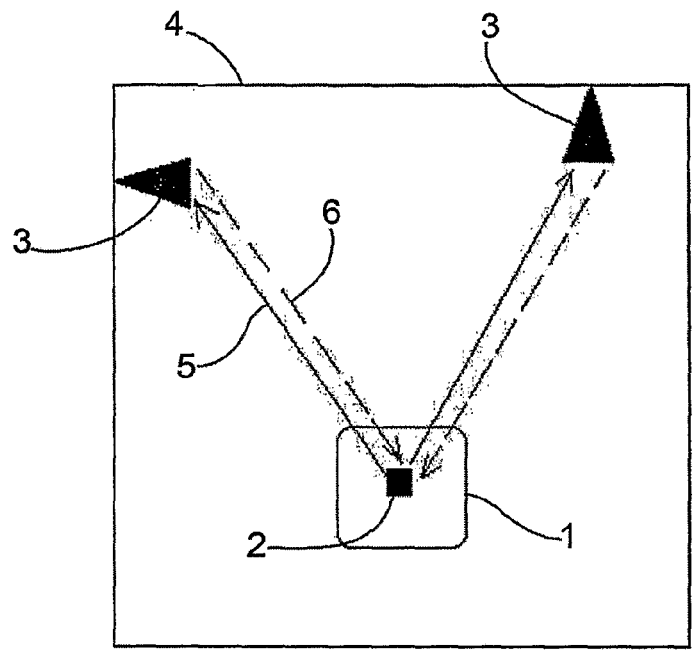
FIG. 1 shows a schematic view of a positioning system for vehicles according to the present invention.
Figure 2:
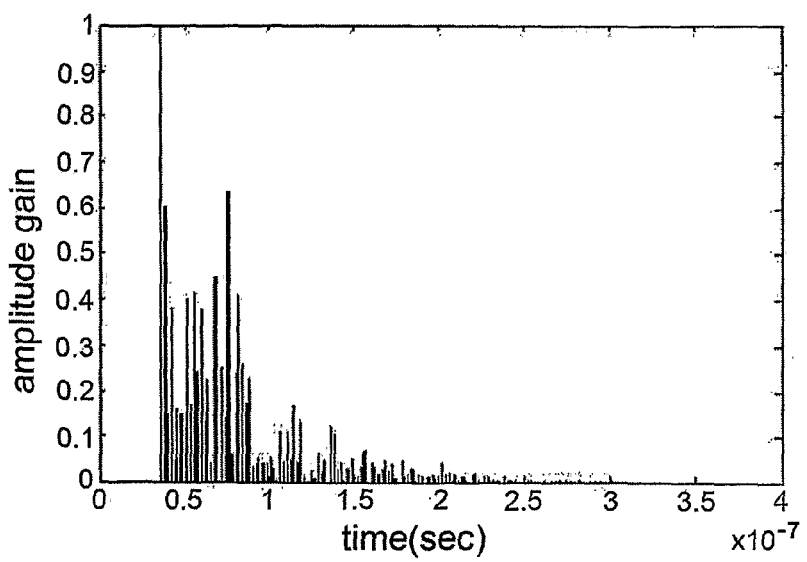
FIG. 2 shows a diagram indicative of the pattern of the impulse response of a closed area for a positioning system according to the prior art.

According to what shown in the annexed figures, the positioning system according to the present invention essentially comprises some reference antennas 3 located in known positions of an area 4, in particular a closed area, for example a warehouse or a store, wherein vehicles 1 to be localised move, in turn provided with a two-way radio directive or omnidirectional antenna 2. As will appear more clearly in the following description, vehicles 1 may be automatic guided vehicles, also called AGV vehicles, or manual guided vehicles, that is, guided by an operator.

In the case of AGV vehicles, the positioning system according to the present invention provides the necessary information for the vehicle movement to the automatic guide devices.

In the case of manual guided vehicles, the positioning system according to the present invention provides the operator with the information on the presence of other vehicles in the zone and optionally, for safety reasons, it may also intervene on the vehicle controls, for example on the vehicle motor and/or on the brakes and/or on the steering, so as to prevent collisions with the other vehicles, in particular with the AGV vehicles.

The reference antennas 3 of the system according to the present invention comprise retro-directive arrays 17, also defined by the abbreviation RDA.

These retro-directive arrays 17 are of the type that, if impinged by a signal with predetermined features, they respond emitting a signal in the same source direction as the interrogating signal, without knowing the source direction in advance.

According to a version of the present invention, the reference antennas 3 and the respective arrays 17 comprise further encoding means 28 (FIG. 13) that allow antennas 3 to receive a particular signal at a certain frequency and to retransmit it encoded, thus allowing the identification of the specific retro-directive antenna that is responding.

Figure 3:
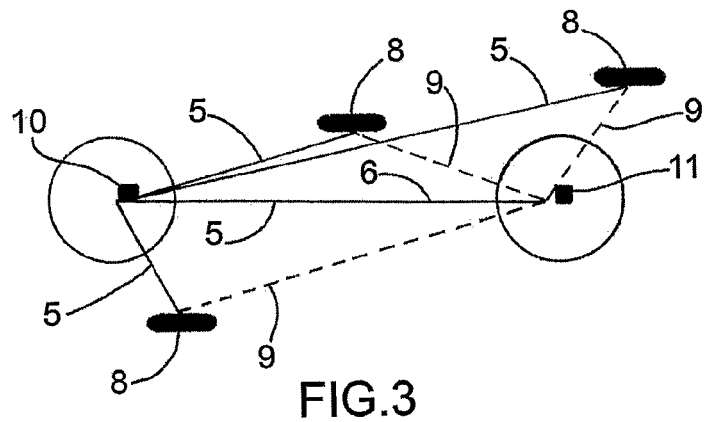
FIG. 3 shows a schematic view of a positioning system for vehicles with omnidirectional antenna on the vehicle and omnidirectional reflecting antenna in the warehouse.
Figure 4:
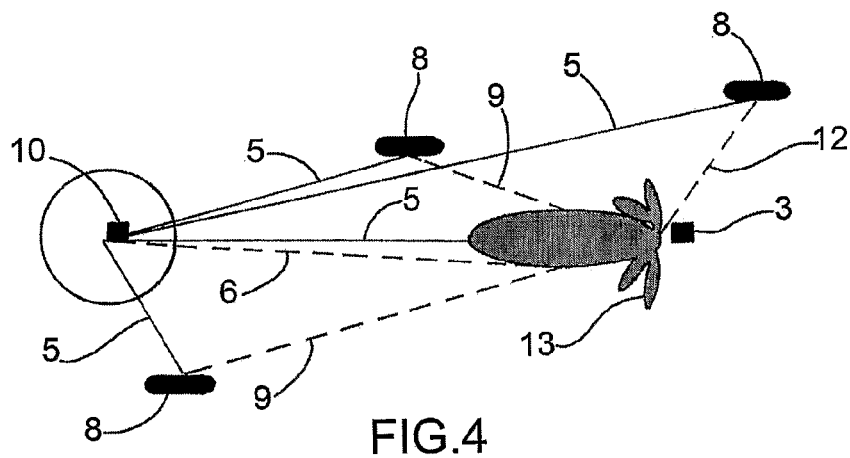
FIG. 4 shows a schematic view of another positioning system for vehicles with omnidirectional antenna on the vehicle and directive reflecting antenna in the warehouse.
Figure 5:
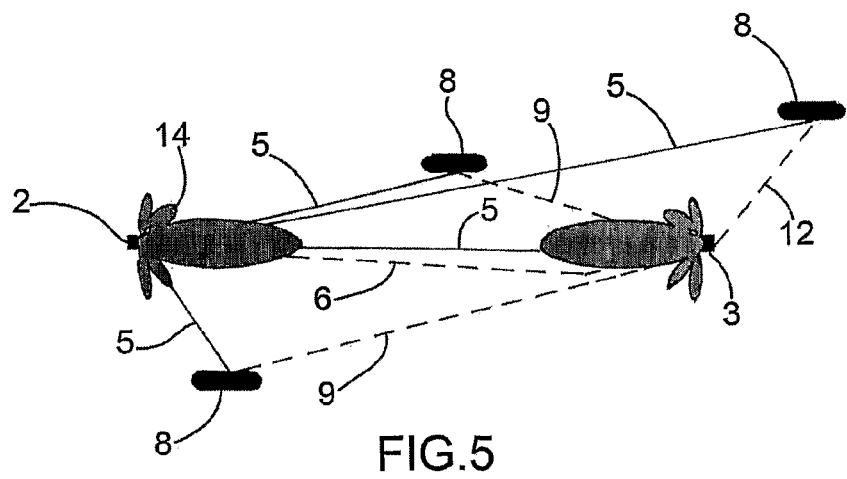
FIG. 5 shows a schematic view of another positioning system for vehicles with directive antenna on the vehicle and directive reflecting antenna in the warehouse.
Figure 6:
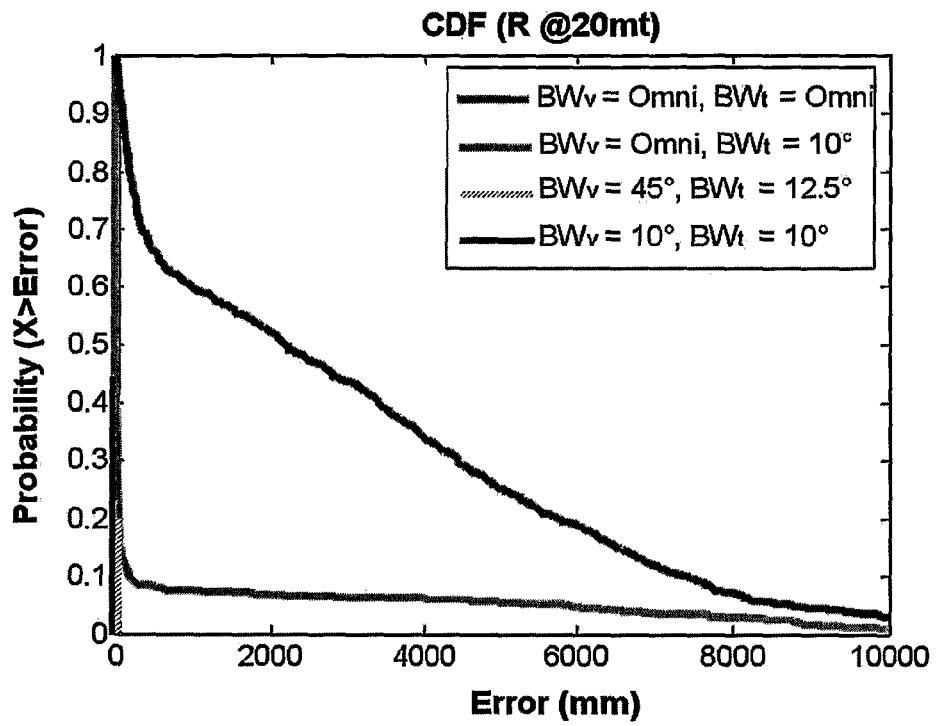
FIGS. 6 and 7 are two diagrams that show the results of computer simulations for the positioning errors based on the width of the antenna main lobe and show the precision gain obtained with narrow radiation lobes, the simulations confirm that this feature limits the noise due to multiple paths.
Figure 7:
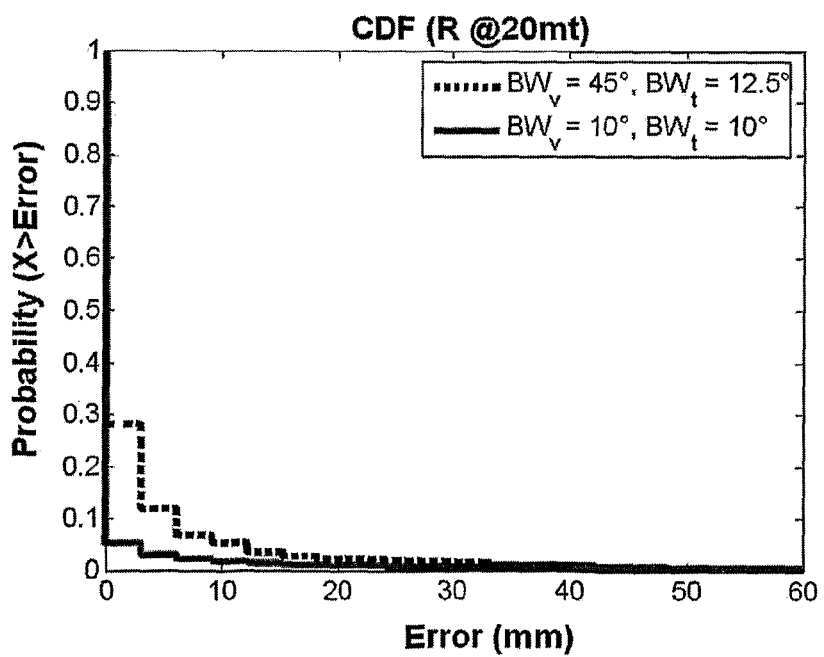

FIGS. 3-5 show some possible situations of transmission of signals between a vehicle to be localised and a reflecting antenna in relation to the type of antenna used and to the interferences due to multiple paths.

In particular, FIG. 3 shows the patterns of the transmission and reception signals with two omnidirectional antennas both on the vehicle and on the reflecting antenna arranged in the area.

The two-way radio antenna 10 of the vehicle transmits signals 5 in all directions. These signals 5 are reflected by some obstacles 8 also reaching the reflecting antenna 11 according to trajectories 9 and generating response signals that will likely cover the same trajectories in the reverse direction 9-5.

Signals 5 therefore go back to antenna 10, but they should not be considered for the vehicle positioning purposes.

Signal 6, which should be the only one to be considered for the vehicle positioning purposes, is also reflected by the reflecting antenna 11. However, signal 6 is disturbed by the other signals 5 due to the multiple paths.

FIG. 4 shows the patterns of the transmission and reception signals with an omnidirectional two-way radio antenna on the vehicle and a directive reflecting antenna arranged in the area.

Also in this case, the two-way radio antenna 10 of the vehicle transmits signals 5 in all directions. These signals 5 are reflected by some obstacles 8 generating signals 9 that, however, are not reflected or are only minimally reflected by the reflecting antenna 3, since this antenna 3 is directive and prefers a reception zone in a specific direction, according to the transmission and reception diagram 13.

Antenna 3 therefore rejects, or better highly attenuates, most reflected signals that are not, and cannot be, in the reception zone of the antenna.

As a consequence, only signal 6 directly coming from the reflecting antenna 3, returns to antenna 10, such signal 6 is the signal that must be considered for the vehicle localisation. Signal 6 is not disturbed by the other signals 5 due to the multiple paths, since most paths 9 have been attenuated and thus not been reflected by antenna 3.

It is therefore noted that the use of a directive antenna 3 for the area greatly reduces the noise due to signals 9 of the multiple paths.

FIG. 5 shows the patterns of the transmission and reception signals with a two-way radio directive antenna on the vehicle and a directive reflecting antenna arranged in the area.

In this case, the two-way radio directive antenna 2 of the vehicle transmits signals 5 mainly in one direction, that is, according to the transmission and reception diagram 14.

Transmission signals 5 of antenna 2 may be reflected by some obstacles 8 generating noise signals 9, however the probability of meeting obstacles 8 is much lower compared to the emission of an omnidirectional antenna in all directions.

Moreover, also in this case, signals 9 are not reflected or are only minimally reflected by the reflecting antenna 3, since this antenna 3 is directive too, and thus rejects most reflected signals.

Moreover, since antenna 2 is directive in reception, too, only the signal in the reception zone does not undergo significant attenuations, that is, signal 6 directly coming from the reflecting antennas 3 and which is the signal that must be considered for the localisation.

Therefore, signal 6 is not disturbed by the other signals 5 due to the multiple paths, since most multiple paths are much attenuated by the directive emission of antenna 2, then by the directive reflection of antenna 3 and then by the directive reception of antenna 2.

In the following embodiments of the present invention, antennas 3 of FIGS. 4 and 5 are made with retro-directive arrays, which respond by emitting in the same source direction of the interrogating signal, without knowing in advance the source direction thereof and which therefore behave like what described above.

In some embodiments of the present invention, reference shall be made to a version with directive antennas on the vehicle and with retro-directive antennas in the reference points of the area.

However, according to a simplified version of the present invention, the vehicle exhibits an omnidirectional two-way radio antenna and retro-directive reflecting antennas are positioned in the reference points of the area.

This latter version allows obtaining sufficient vehicle localisation accuracy, although less than that with directive antennas, and is less cumbersome to be installed on the vehicle. This version can therefore be easily installed on manual guided vehicles that have less space available compared to AGV vehicles.

The positioning system according to the present invention therefore comprises three main groups:

one or more vehicles 1, optionally of the automatic guided type, that move within an area 4;

at least one two-way radio directive or omnidirectional antenna 2 mounted on each vehicle 1, a plurality of retro-directive reference antennas 3 located in known positions within area 4.

Generally, the reference antennas 3 must be at least three to be able to provide a correct vehicle localisation.

If the directive antenna 2 is mounted on the vehicle, it is made so as to transmit radio frequency waves at any time in a certain direction and receive at the same time radio waves reflected by the retro-directive tags 3 from that same direction; moreover, it is made so as to irradiate at different times in different directions, so as to cover all possible directions in a certain time interval.

The retro-directive tags 3 according to the present invention reflect the radio waves received in a same and contrary direction relative to that of the incident wave.

Tags 3 are located in known positions within area 4, the above positions of tags 3 are stored in suitable control means, which shall be better described hereinafter.

The data received as radio waves reflected by tags 3 and received by the vehicle antenna 2 are processed by the control means, thus allowing accurately determining the position of vehicles 1 in area 4 and relative to other vehicles that are in area 4.

According to a version of the invention, if tags 3 are provided with the encoding means 28 the control means can identify which tag 3 is reflecting, by means of the identification code assigned to each tag 3 by the encoding means 28.

According to a version of the present invention, this type of tag 3 can also be used in combination with a vehicle provided with an omnidirectional antenna. Being provided with encoding, tags 3 help to increase the vehicle localisation accuracy as they can be distinguished, thanks to the encoding, also relative to the multiple paths coming from the reflection of signals coming from an omnidirectional antenna.

The spatial and temporal data resulting from the communication through the radio waves transmitted and reflected by the vehicle antennas 2 and reflected by tags 3, are suitably processed through the above control means, for example comprising software-assisted microprocessor means.

The control means may be on each vehicle 1 and be coordinated with one another or they may be in a fixed position of area 4.

According to yet another version of the invention, the control means may be distributed among vehicles 1 and area 4.

The various portions of the control means may communicate with each other using wireless local area networks or WLAN, for example Wi-Fi (abbreviation of Wireless Fidelity) networks.

Figure 8:
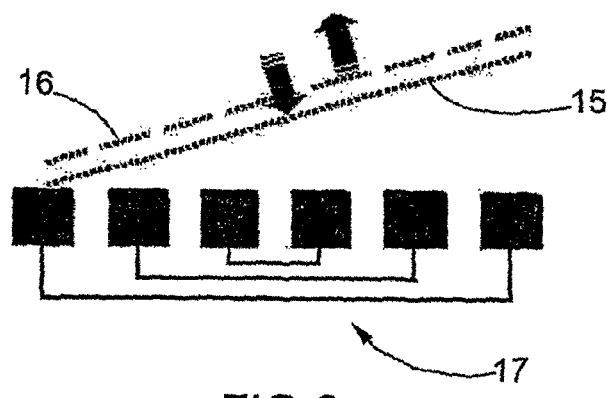
FIGS. 8 and 9 show a schematic view of the operation and the structure of a retro-directive reflecting antenna according to the present invention.

As already mentioned above, the reference antennas 3 of the system according to the present invention comprise retro-directive arrays 17, which are characterised in that they reflect an incoming signal, for example radio wave, in the same direction as the incident beam without the need of knowing the incidence angle. The signal itself is reflected according to a direction identical to that of incidence but in an opposite way, as indicated in FIG. 8.

Figure 9:
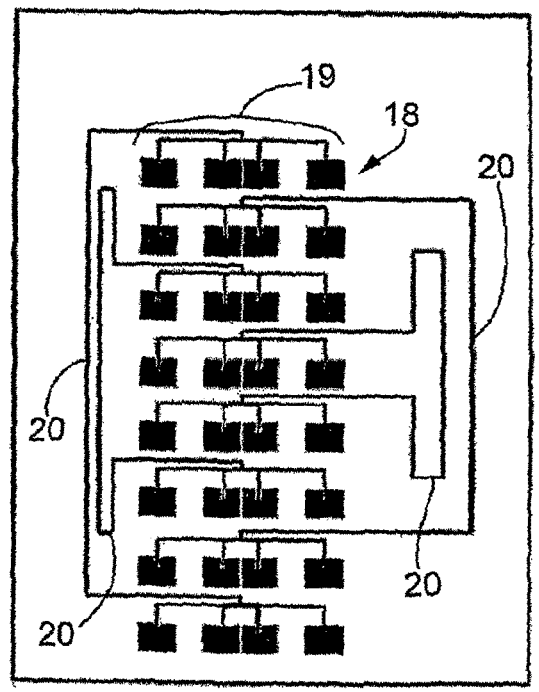

FIG. 9 shows an example of structure, or lay-out, of retro-directive tags according to the present invention: four radiating elements 18 are connected in parallel so as to create sub-arrays 19: the reason why sub-arrays are provided in place of single elements shall be explained hereinafter. Sub-arrays 19 are in turn connected in series to other sub-arrays 19 in a symmetrical manner; the number of radiating elements in each sub-array and the number of sub-arrays in each retro-directive tag is purely indicative.

As already mentioned above, some of the reference antennas 3 of the system, that take a role of reference nodes or reference tags, may comprise encoding means 28.

The above encoding means comprise an identification code ID of the node or tag, thus obtaining a much simpler positioning, since more information is available for these retro-directive arrays.

By way of an example, let's consider the implementation of a reference tag in an FMCW, that is, frequency modulated continuous wave, system.

Interrupting the paths that connect the various elements of the retro-directive array, it is possible to switch off the tag. This interruption may be obtained by positioning a switch, that is, a variable capacity element or varactor 28, which varies its capacity according to a law, for example square wave, on a path—or better, on all paths. The square wave may be set to a frequency that is typical of the tag and that therefore identifies it.

In this way, when an FMCW signal impinges the retro-directive tag, it reflects it multiplying it by a square wave. The resulting signal exhibits frequency components around the fundamental frequency of the square wave—1/T, se if T is the square wave period—and thus decoding the reflected signal of that particular tag it is possible to identify it, thanks to the square wave frequency.

Figure 13:
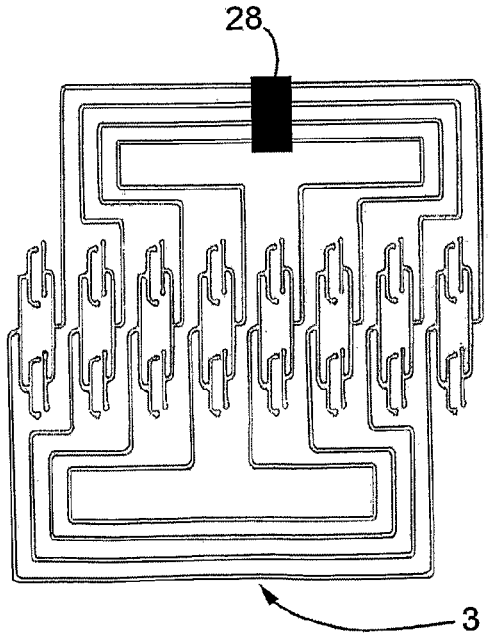
FIG. 13 shows another version of a retro-directive reflecting antenna according to the present invention.

Varactor 28 may be powered by a small battery integrated in the tag, and may last several years while operating uninterruptedly, as it does not consume much power; it is therefore not necessary to power the tag from the outside. FIG. 13 shows the possible position of varactors 28 in a typical layout of a retro-directive array.

Figure 10:
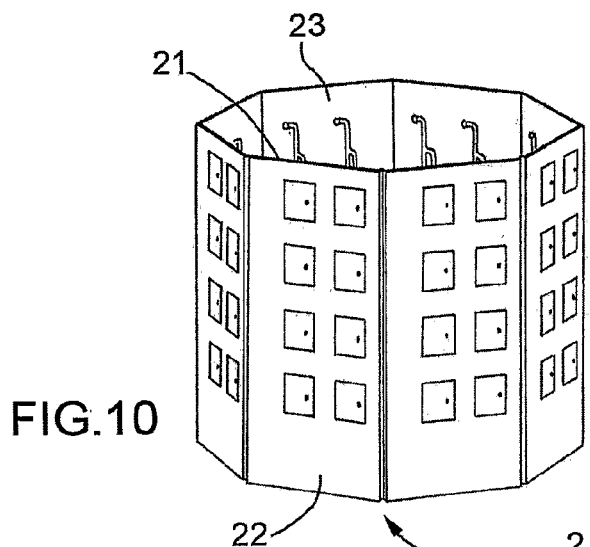
FIGS. 10-12 show the structure and some details of a sector antenna to be mounted on the vehicles according to the present invention.
Figure 11:
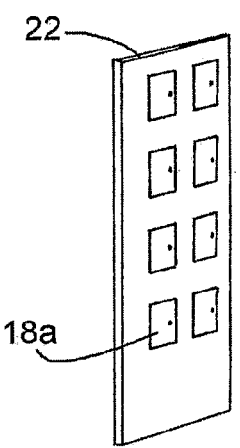
Figure 12:
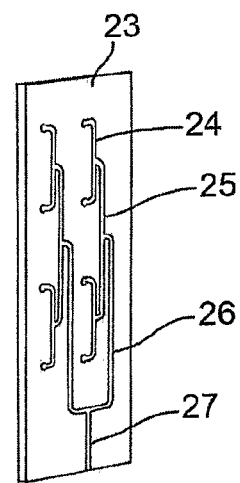

Vehicles 1 according to the present invention are provided with a sector antenna 2 which is shown in greater detail in FIGS. 10-12.

The sector antenna 2 comprises a plurality of radiating panels 21 connected to one another, suitable for carrying out a 360 degree azimuth scanning.

FIG. 10 shows a single antenna which may be, without distinction, a transmitting antenna TX or a receiving antenna RX, since the two antennas are substantially similar.

In the vehicle, the two antennas TX and RX may be mounted superimposed and at any time they can transmit and receive in the same azimuth direction, or transmission and reception may also be carried out with the same antenna; in this last case, the transmission and reception signals are separated by a device called "circulator".

In the embodiment shown in FIG. 10, each antenna TX and RX has a prism shape with octagonal base, with radiating panels 21 arranged on the side surface of the prism, which form the faces of the same side surface.

The radiating panels 21 exhibit an outer surface 22 (FIG. 11) whereon the flat elements 18a, either transmitting or receiving, also called patch, are positioned, and an inner face 23 (FIG. 12) where the connections existing between the various elements 18a are seated.

Thanks to this construction it is possible to ensure a 360 degree scanning on the azimuth plane without the aid of rotating systems, since the emission or reception of each radiating panel is obtained through electronic switching.

According to another version of the present invention, the azimuth scanning may be carried out mechanically making two radiating panels 21, a TX one and an RX one, rotate integrally.

By way of a non-limiting example, according to what shown in FIG. 12, elements 18a are connected as follows: two contiguous elements 18a present on the same radiating panel 21 are connected in parallel for forming a sub-array 24, two contiguous sub-arrays 24 present on the same radiating panel 21 are connected in parallel for forming, in turn, a sub-array 25, finally two contiguous sub-arrays 25 present on the same radiating panel 21 are connected to each other in parallel for forming a sub-array 26.

Array 26 is further connected in series to the other sub-arrays present on the other sectors, that is, the side faces of the prism, through connections 27.

By way of a non-limiting example, noting that the number of radiating elements 18a in each radiating panel and the number of radiating panels used is purely an indication, the main construction features of antenna 2 are:

a transmitting antenna TX having a diameter of about 18 cm and a height of about 13 cm;

a receiving antenna RX of the same dimensions as antenna TX, polarised orthogonally to the transmitting antenna;

antennas TX and RX are positioned one on top of the other;

the total dimensions of antenna 2 therefore are about 18 cm diameter and about 26 cm height.

The flat elements 18a, either transmitting or receiving, have suitable dimensions for meeting the emission or reception beam width (BW) requirements also according to the number of sectors that make up antenna 2.

Since each radiating panel 21 generates a beam that illuminates an angular sector with a certain alpha angular width, the number n of radiating panels 21 must be such as to cover the entire scanning angle, which is 360 degrees, that is, in general, it will be alpha·n≥360.

The prism shape with octagonal base is a good compromise between the need of having radiating panels with a good directive power and the fact of not having too large a number of panels.

Of course, the prism shape with octagonal base is only an example, and different shapes are also possible, with polygonal bases with a larger number of sides: for example, 10, 12 sides etcetera, or also an array with cylindrical symmetry, without departing from the scope of protection of the invention.

Thanks to this construction solution, the antenna does not exhibit moving parts and is therefore suitable for the application on large sized vehicles such as, for example, vehicles for carrying goods in a warehouse.

The electronic azimuth scanning can take place in different ways: in a continuous manner or stepwise. In the continuous mode, the radiating panels 21 are powered so as to rotate the beam in very little steps (in the order of a degree), so as to result as much as possible in a continuous rotation. In the stepwise mode, each radiating panel 21 exhibits a beam with alpha azimuth width (for example 50 degrees), at each step the antenna will illuminate an angular sector rotated relative to the previous one by a beta azimuth angle (in general it will be beta=360°/n (where n is the number of sectors), for example 45 degrees for 8 sectors); there may be different combinations of alpha and beta, in general with beta≤alpha.

By way of an example, below is a description of a possible application of the directive antennas described above to a specific positioning system operating in radio frequency with FMCW technology; the same concept may be used with other technologies (for example UWB) and on other frequencies, provided that the antennas are suitably designed.

FIG. 18 shows a block diagram of the FMCW radar system by way of an example.

A sweep generator 39 generates a signal that is amplified by a power amplifier 40. The signal transmitted is normally a frequency modulated sinusoid according to a time periodic law: time linear laws are commonly used, for example a sawtooth, but exponential functions are also possible.

The amplified signal is in turn filtered by a radio frequency filter 41 and then sent to the transmitting element 7 (TX) of antenna 2 to be transmitted.

The receiving element 48 (RX) of antenna 2 receives a reflected signal, for example from a tag 3° signal that is then filtered by a radio frequency filter 41.

The filtered signal is then made to pass through two amplifiers in a series, a first low noise amplifier 43 and then a second power amplifier 40.

In output from the second power amplifier 40, the signal received 49 is conveyed in a mixer 47 wherein it is multiplied by signal 50 coming from the scanning signal generator 39.

In output from node 47, the signal is filtered by a low-pass filter 42 and sent to an automatic gain control 44.

This FMCW described above, according to the current state of the art, is among the most precise techniques for assessing the flight time of a signal that, after having been transmitted, has been reflected by an obstacle; the FMCW systems therefore allow calculating the distance from an object that has reflected the signal transmitted. Actually, in the FMCW system the signal transmitted is multiplied by a time delayed version thereof, that is, the signal received: suitably selecting the transmitted signal, for example the sawtooth, at the output of filter 42 it is possible to obtain a tone the frequency whereof is proportional to the delay of the signal received relative to that sent, and thus it allows precisely assessing the flight time of the signal transmitted.

At the output of module 44, the signal is directed to an analogue-digital converter 45 that samples the signal, converts it into digital and provides the samples to a programmable numerical processing module 46 which allows handling and analysing them according to various algorithms, so as to determine the vehicle distance from various known reference points and thus assess the position thereof.

The digital processing module 46 is further capable of controlling, through a numerical control signal 52, the electronic rotation of elements 7 and 48.

By way of a non-limiting example, below are some values of the frequency, of the antenna radiation diagrams and of the signal transmitter power, these values respect the current European standards:

Central frequency: 5.8 GHz,
Bandwidth: 150 MHz, frequency range 5725-5875 MHz,
Power (EIRP): 25 mW.

Vehicle Radiation—Antenna Diagram:
Main lobe width in the azimuth plane: 45°,
Main lobe width in elevation: 60°,
Expected gain Gvmax: 14 dB, maximum distance direction.

Tag Radiation—Antenna Diagram:
Main lobe width in the azimuth plane: 12.5°,
Main lobe width in elevation: 60°,
Expected gain Gvmax: 20 dB (maximum distance direction).

An important feature of the present invention, which allows considerably reducing the effect of multiple paths, or "multipath", is the accurate selection of the antenna beam polarisation and shaping, that is, of the retro-directive tags and of the sector antenna 2 on vehicle 1.

The shaping is a feature of the radiating elements of the antenna, such that the electrical field phases, in transmission and reception, combine so as to allow the propagation of the electromagnetic waves according to particular directions and attenuate it in others. The means for obtaining the shaping of the electromagnetic wave propagation are generally known and so, they are not described in detail herein.

Appropriately choosing these two parameters in designing the antennas, that is, beam shaping and polarisation, allow highly attenuating the signals coming from reflecting elements other than the retro-directive tags, or reducing other undesired shares, such as the signals coming from other vehicles, wall reflection, obstacles, etcetera, to the advantage of a higher position accuracy of vehicle 1.

The retro-directive tags 3 and the sector antenna 2 can operate according to two types of polarisation, that is, circular or linear: below are two non-limiting examples relating to the selection of beam shaping and polarisation for the antennas in the system, in particular an example for circular polarisation antennas and one for linear polarisation antennas.

With the circular polarisation, the sector antenna 2 transmits through the transmitting element 7 (TX) and receives through the receiving element 48 (RX) with the same polarisation, for example right hand circular polarisation RHC or left hand circular polarisation LHC; tags 3 reflect the signal transmitted by the transmitting element 7 (TX), with the same polarisation received, but only one of the two polarisations (RHC or LHC) is reflected in a retro-directive manner.

As a consequence, the receiving element 48 (RX) receives a signal with the same polarisation as the starting signal; if an obstacle accidentally reflects the signal, the polarisation is modified—for example from right hand circular to left hand circular—and as a consequence, the reflected signal is not received by the receiving element 48 (RX).

In brief, as regards circular polarisation, the main features are (FIGS. 14 and 15):

vehicle 1 transmits and receives with the same polarisation, for example right hand circular (RHC) or left hand circular (LHC);

tags 3 reflect with the same polarisation: signal 30 is reflected in a retro-directive manner in signal 31, which is correctly received by the RX element of the directional antenna 2 of vehicle 1, but signal 29 (FIG. 15) is reflected in a non retro-directive manner in signal 32 as it has a polarisation differing from 30;

the signals that undergo an odd number of reflections on the walls of area 4 reverse their polarisation: signals 29 accidentally reflected by the walls are not received by vehicles 1;

vehicles 1 may interfere with each other through the direct path 30, as they receive and transmit with the same polarisation, so it is necessary to shape the transmission and reception beam of the sector antenna 2 so as to aim upwards (see FIG. 14), as indicated by the dash and dot lines S that schematically show the space wherein the signals are transmitted;

tags 3 may be positioned arbitrarily on the walls or on the ceiling, as shown in FIG. 15;

multiple path components due to the reflection on the walls, such as of signal 29 in FIG. 15 reflected in signal 32, are avoided, so shaping the beam of tags 3 is not necessary.

With the linear polarisation (FIG. 17), the sector antenna 2 transmits, through the transmitting element 7 (TX), a vertically or horizontally polarised signal 37 and receives, through the receiving element 48 (RX), a signal 38 with polarisation orthogonal to that of transmission.

Tags 3 reflect with a signal 38 having a polarisation orthogonal to that of the received signal 37, that is, that sent by the transmitting element 7 (TX) of antenna 2.

In this case, the accidental reflections maintain the same polarisation and as a consequence, they are not received by the receiving element 48 (RX) of antenna 2.

However, a signal 37*a* that undergoes a reflection before impinging the tag is reflected in a retro-directive manner with a signal 38*a* having proper polarisation: these multiple reflections may create signals having the same polarisation as RX, and thus cause multiple path effects as illustrated in FIG. 17.

The solution in this case is to shape the beam of tags 3 so as to attenuate the signals coming from unexpected directions and/or not congruent with the starting signal, such as the ceiling, see FIG. 17).

To clarify what described, FIG. 17 schematically show two dash and dot lines S that define the space within which the signals are reflected without any attenuation: on the other hand, those coming from directions not comprised in such space are attenuated.

As regards linear polarisation, the main features are (FIGS. 16 and 17):

vehicle 1 transmits a signal with a horizontal or vertical polarisation and receives a signal with a polarisation orthogonal to that transmitted, vertical or horizontal, respectively;

tags 3 reflect with a polarisation orthogonal to that of the incident signal;

in general, the walls maintain the same polarisation, the multiple reflections that do not impinge a tag are not "seen" by vehicles 1;

vehicles 1 do not see each other;

tags 3 must be positioned according to a predetermined orientation on the walls and on the ceiling, for example always perpendicular to the ceiling, as shown in FIGS. 16 and 17;

multiple paths due to reflections on the walls that impinge the tag may reach vehicle 1, although they certainly are less intense;

the multiple path effect may be reduced by shaping the radiation diagram of tags 3.

The positioning system must be assisted by a software suitably programmed on site in the design stage according to the arrangement of the tags and to the operating mode.

The positioning system for vehicles according to the present invention therefore allows localising one or more automatic guided vehicles with the utmost accuracy, for example in the order of few centimeters, within an area, in particular a closed area, for example a warehouse or a store.

The use of retro-directive antennas in tags 3 and of sector antennas 2, in addition to the polarisation, and optionally to the shaping of the radiation diagrams of the antennas, allows obtaining, according to the measurements and the experiments made, a precise positioning with a tolerance in the order of few centimeters compared to the +/−30 cm of the traditional positioning systems.

In the most complete version of the present invention, the reference antennas 3 are retro-directive, they encode the signal over time adding an identification code, through the encoding means 28, shape the antenna beam through means for shaping the beam, especially in elevation, and reverse the signal polarisation relative to the reflection of a passive obstacle, that is:

from linear horizontal they make it vertical, whereas a passive obstacle would reflect it linear horizontal, or from linear vertical they make it horizontal, whereas a passive obstacle would reflect it linear vertical, or from right hand circular they reflect it right hand circular, whereas a passive obstacle would reflect it left hand circular, or from left hand circular they reflect it left hand circular, whereas a passive obstacle would reflect it right hand circular.

The reference antennas 3 located in the area comprise:

retro-directive arrays on the azimuth plane in the tags, encoding means 28 that add an identification code to the return signal, tags with a beam shaped in elevation to avoid signals coming from directions not congruent, thus avoiding multiple paths, tags that reverse the polarisation.

It should also be noted that the reference antennas exhibit a beam shaping on a plane other than where the retro-directivity takes place: the retro-directivity is carried out on the azimuth plane of the tag, whereas the shaping is carried out on the elevation plane of the tag antenna.

The construction of the sector antenna 2 according to a polygonal geometry structure, in particular octagonal prism, allows obtaining a 360 degree signal scanning without the need of members for moving the antenna itself.

The construction shape of the sector antenna 2 drastically reduces the dimensions of the antenna itself, allowing higher speed and accelerations to vehicle 1 since the inertia of the two-way radio system is considerably reduced, to the advantage of a higher working speed, which corresponds to less time needed for carrying out the operations and as a consequence, considerable cost saving.

The combined use of retro-directive antennas 3 and of sector antennas 2, the accurate selection of the antenna polarisation and optionally the shaping of the radiation diagrams of the same antennas, allow the maximum use of the area capacity and spaces, because subject to the need of ensuring a line of sight between a minimum of tags 3 and antennas 2, the tags need not be localised in particular positions, and any reflecting obstacles affect the positioning accuracy in a controlled manner.

The use of varactor 28, moreover, allows identifying the corresponding tag thus increasing the information available for the software, intended for processing all the data resulting from the system in order to assess the position of vehicle 1.

These data, besides considerably improving the system performance in terms of positioning accuracy and speed, allow determining an optimum path for the vehicles and allow correcting the path itself during the movement, with the advantage of obtaining an even higher operating speed and energy saving, due to the reduction of useless paths of the vehicle itself.

The use of retro-directive arrays such as the reference tag and of sector antennas for the vehicles in a positioning system may be very advantageous and greatly improve the system performance, measurement speed and accuracy.

In particular, the use of tags and sector antennas combined with the encoding of a tag identification number and with the polarisation techniques greatly reduce multiple paths, allowing a positioning with a tolerance of about 5 cm.

The positioning system described herein may be used in simplified or scaled forms, for example with smaller and simpler antennas, not only for automatic guided vehicles but also for localising manual guided vehicles with operator, and for keeping track of the movements thereof in an electronic system.

The present invention has been described according to preferred embodiments but equivalent versions may be conceived without departing from the scope of protection offered by the claims.

The invention claimed is:

1. A positioning system for vehicles in an area, said system operating with radio frequency devices based on Ultra-Wide-Band or Frequency-Modulated Continuous Wave, comprising:
    a two-way radio antenna, associated with each vehicle, including a transmitting element and a receiving element;
    a plurality of reference antennas located in known predetermined positions within the area, said reference antennas having retro-directive arrays, said retro-directive arrays including:
        means for shaping the signal beams in elevation;
        means for polarising transmission and reception signals according to a circular polarization, said means for polarising reflecting in a retro-directive manner signals having the same polarisation as the incident ones;
    encoding means, or signal processing means, for transmitting an identification code of the reference antenna;
    control means for processing the spatial and temporal data resulting from the communication through the radio waves transmitted and received by the vehicle antennas and reflected by said reference antennas, said control means calculating the distance of the vehicle from the reference antennas that have reflected the signal transmitted by the antennas.

2. The positioning system for vehicles according to claim 1, wherein the transmitting element and the receiving element of the two-way radio antenna comprise sector directive antennas formed by a plurality of radiating panels with directive transmission and reception arranged and connected for carrying out a 360 degree scanning.

3. The positioning system for vehicles according to claim 2, wherein the transmitting element and the receiving element of the two-way radio antenna comprise means for shaping the signal beams.

4. The positioning system for vehicles according to claim 3, wherein said means for shaping the signal beams shape the beam of the elevation signal, said means for shaping allowing the propagation of the electromagnetic waves according to predetermined directions and attenuating electromagnetic waves in others, so as to attenuate the signals coming from unexpected directions.

5. The positioning system for vehicles according to claim 4, wherein the transmitting element and the receiving element of the two-way radio antenna comprise means for polarising the signals.

6. The positioning system for vehicles according to claim 5, wherein the transmitting element and the receiving element of the two-way radio antenna comprise means for polarising the signals in a circular manner, such that said two-way radio antenna is of the type with circular polarisation.

7. The positioning system for vehicles according to claim 6, wherein the transmitting element and the receiving element respectively transmit and receive signals having the same polarisation.

8. The positioning system for vehicles according to claim 1, wherein said encoding means comprise at least one element with variable capacity, positioned on at least one of the paths connecting said retro-directive arrays, suitable for varying its capacity according to a predetermined law, so as to multiply the signal reflected by said reference antenna according to said law and so as to identify said reference antenna.

9. A positioning system for vehicles in an area, said system operating with radio frequency devices based on Ultra-Wide-Band or Frequency-Modulated Continuous Wave, comprising:
    a two-way radio antenna, associated with each vehicle, including a transmitting element and a receiving element;
    a plurality of reference antennas located in known predetermined positions within the area, said reference antennas having retro-directive arrays, said retro-directive arrays including:
        means for shaping the signal beams in elevation;
        means for polarising transmission and reception signals according to a a linear polarisation, said means for polarising reflecting in a retro-directive manner signals having orthogonal polarisation;
    encoding means, or signal processing means, for transmitting an identification code of the reference antenna;
    control means for processing the spatial and temporal data resulting from the communication through the radio waves transmitted and received by the vehicle antennas and reflected by said reference antennas, said control means calculating the distance of the vehicle from the reference antennas that have reflected the signal transmitted by the antennas.

10. The positioning system for vehicles according to claim 9, wherein the transmitting element and the receiving element of the two-way radio antenna comprise sector directive antennas formed by a plurality of radiating panels with directive transmission and reception arranged and connected for carrying out a 360 degree scanning.

11. The positioning system for vehicles according to claim 10, wherein the transmitting element and the receiving element of the two-way radio antenna comprise means for shaping the signal beams.

12. The positioning system for vehicles according to claim 11, wherein said means for shaping the signal beams shape the beam of the elevation signal, said means for shaping allowing the propagation of the electromagnetic waves according to predetermined directions and attenuating electromagnetic waves in others, so as to attenuate the signals coming from unexpected directions.

13. The positioning system for vehicles according to claim 12, wherein the transmitting element and the receiving element of the two-way radio antenna comprise means for polarising the signals.

14. The positioning system for vehicles according to claim 13, wherein the transmitting element and the receiving element of the two-way radio antenna, when the active retro-directive arrays include means for polarising transmission and reception signals according to a linear polarisation, comprise means for polarising the signals in a linear manner, such that said two-way radio antenna is of the type with linear polarisation.

15. The positioning system for vehicles according to claim 14, wherein the active retro-directive arrays of the reference antennas is configured to reflect, in a retro-directive manner, signals having polarisation orthogonal to that of the incident signals.

16. The positioning system for vehicles according to claim 15, wherein the transmitting element and the receiving element are respectively configured to transmit and receive signals having polarisation orthogonal relative to one another.

17. The positioning system for vehicles according to claim 9, wherein said encoding means comprise at least one element with variable capacity, positioned on at least one of the paths connecting said retro-directive arrays, suitable for varying its capacity according to a predetermined law, so as to multiply the signal reflected by said reference antenna according to said law and so as to identify said reference antenna.

* * * * *